US008371130B2

(12) United States Patent
Aldraihem

(10) Patent No.: US 8,371,130 B2
(45) Date of Patent: Feb. 12, 2013

(54) TRAVELLING WAVE THERMOACOUSTIC PIEZOELECTRIC SYSTEM FOR GENERATING ELECTRICAL ENERGY FROM HEAT ENERGY

(75) Inventor: Osama J Aldraihem, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 387 days.

(21) Appl. No.: 12/763,860

(22) Filed: Apr. 20, 2010

(65) Prior Publication Data

US 2011/0252811 A1 Oct. 20, 2011

(51) Int. Cl.
*F25B 9/00* (2006.01)

(52) U.S. Cl. ............................................. 62/6; 62/235.1

(58) Field of Classification Search .................. 62/6, 3.1, 62/235.1, 335; 60/517, 641.8; 310/322, 310/334; 126/569, 684
See application file for complete search history.

(56) References Cited

U.S. PATENT DOCUMENTS

| 6,032,464 | A * | 3/2000 | Swift et al. ...................... 60/520 |
| 6,560,970 | B1 * | 5/2003 | Swift ................................. 62/6 |
| 6,574,968 | B1 * | 6/2003 | Symko et al. ...................... 62/6 |
| 6,804,967 | B2 * | 10/2004 | Symko et al. ...................... 62/6 |
| 7,240,495 | B2 * | 7/2007 | Symko et al. ...................... 62/6 |
| 2003/0196441 | A1 * | 10/2003 | Swift et al. ......................... 62/6 |
| 2004/0000150 | A1 * | 1/2004 | Symko et al. ...................... 62/6 |
| 2004/0093865 | A1 * | 5/2004 | Weiland et al. ................. 60/520 |
| 2005/0274123 | A1 * | 12/2005 | Smith et al. ........................ 62/6 |
| 2009/0134748 | A1 * | 5/2009 | Penciu .......................... 310/339 |

* cited by examiner

*Primary Examiner* — Mohammad Ali
(74) *Attorney, Agent, or Firm* — Timberline Patent Law Group PLLC; Mark Farrell

(57) ABSTRACT

A travelling wave thermoacoustic piezoelectric apparatus capable of generating electrical energy from heat energy is provided. The travelling wave thermoacoustic piezoelectric apparatus includes a hosing with two ends connected by an inertance component, a porous stack, a resonator, and a piezoelectric bimorph. The housing comprises a compressible fluid and has a first portion and a second portion. The first portion receives heat energy from a heat source for creating a temperature gradient between the first portion and the second portion. A cold heat exchanger within the second portion is positioned at one end of the porous stack. The compressible fluid traverses between the first portion and the second portion through the porous stack and the inertance component to generate travelling acoustic waves. The travelling acoustic waves resonate with the resonator for generating acoustic energy. The piezoelectric bimorph positioned at an end of the resonator opposite to an end of the resonator connected to the second portion, oscillates based on the acoustic energy for generating the electrical energy.

25 Claims, 6 Drawing Sheets

TRAVELLING WAVE THERMOACOUSTIC PIEZOELECTRIC SYSTEM FOR GENERATING ELECTRICAL ENERGY FROM HEAT ENERGY

FIELD OF THE INVENTION

The invention generally relates to generating electrical energy from heat energy, and more specifically, to a travelling wave thermoacoustic piezoelectric system for generating electrical energy from heat energy using travelling thermoacoustic waves.

BACKGROUND OF THE INVENTION

Nowadays thermoacoustic engines are commonly used as heat pumps or refrigerators. The thermoacoustic engines utilize energy associated with thermoacoustic waves to generate electrical energy.

In existing technologies, usually thermoacoustic engines receive heat from a heat source and use a large part of the heat to generate thermoacoustic waves. Further, energy associated with the thermoacoustic waves may be used to perform various types of works. In order to use the energy associated with the thermoacoustic waves, the thermoacoustic engines use a hot heat exchanger and a cold heat exchanger. A porous structure may be configured between the hot heat exchanger and the cold heat exchanger. The porous structure is made up of one or more of metal foils, a metal mesh, a sheet of a foamed metal, and sheets of filter paper. Additionally, the thermoacoustic engines may include one or more moving parts and moving masses to generate the thermoacoustic waves. Further, the one or more moving parts and moving masses require sliding seal mechanisms for their operation. The thermoacoustic waves are generated based on pressure and volume oscillations of a fluid within the thermoacoustic engines. The pressure and volume oscillations of the fluid are generated using the heat energy received from the heat source and movements of the one or more moving parts and moving masses. During operation, high pressure is created within the thermoacoustic waves for generating thermoacoustic waves.

Further, a free piston mechanism may be used to reduce complexities in using the one or more moving parts and moving masses in the thermoacoustic engines. The free piston mechanism in the thermoacoustic engines utilizes gas springs to generate the thermoacoustic waves. The gas springs in the thermoacoustic engines work similar to mechanical pistons, thereby, partially eliminating the need of sliding seal mechanisms. However, the use of the moving masses in the thermoacoustic engines is still required in such thermoacoustic engines.

Therefore, there is a need for a travelling wave thermoacoustic piezoelectric apparatus and a travelling wave thermoacoustic piezoelectric system for generating electrical energy from heat energy using thermoacoustic waves.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
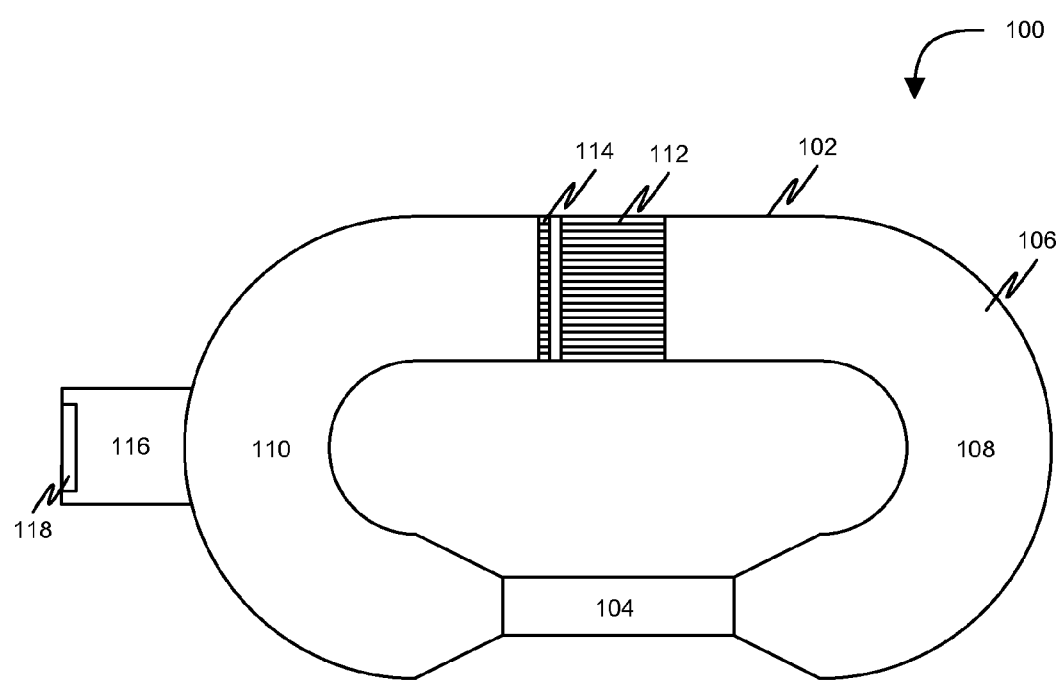
FIG. 1 illustrates a travelling wave thermoacoustic piezoelectric apparatus in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a travelling wave thermoacoustic piezoelectric apparatus and system components related to a travelling wave thermoacoustic piezoelectric system. Accordingly, the apparatus components, method steps and system components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a travelling wave thermoacoustic piezoelectric apparatus. The travelling wave thermoacoustic piezoelectric apparatus generates electrical energy from heat energy. The travelling wave thermoacoustic piezoelectric apparatus includes a housing having two ends. The two ends of the housing are connected by an inertance component. The housing includes a compressible fluid. Additionally, the housing has a first portion and a second portion. The first portion receives the heat energy from a heat source. The heat energy received by the first portion creates a temperature gradient between the first portion and the second portion. Further, the travelling wave thermoacoustic piezoelectric apparatus includes a porous stack within the housing. The porous stack is positioned between the first portion and the second portion. The second portion includes a cold heat exchanger. The cold heat exchanger is positioned near to an end of the porous stack within the housing. The compressible fluid traverses between the first portion and the second portion through the porous stack and the inertance component. Due to traversal of the compressible fluid, travelling acoustic waves are generated within the housing. Further, the travelling wave thermoacoustic piezoelectric apparatus includes a resonator. The resonator has an end connected to the second portion of the housing. The travelling acoustic waves within the housing resonate with the resonator to generate acoustic energy within the resonator. The travelling wave thermoacoustic piezoelectric apparatus also includes a piezoelectric bimorph at an end of the resonator opposite to the end of the resonator connected to the second portion. The acoustic energy generated within the resonator triggers an oscillation of the piezoelectric bimorph for generating the electrical energy.

Referring to figures and in particular to FIG. 1, a travelling wave thermoacoustic piezoelectric apparatus 100 is illustrated, in accordance with an embodiment of the invention. Travelling wave thermoacoustic piezoelectric apparatus 100 generates electrical energy from heat energy. Travelling wave thermoacoustic piezoelectric apparatus 100 includes a housing 102 having two ends. The two ends of housing 102 are connected by an inertance component 104. Housing 102 includes a compressible fluid 106. Compressible fluid 106 is one of air and a helium gas. It may be apparent to a person skilled in the art that any other gases may be used as a compressible fluid inside housing 102. Further, housing 102 includes a first portion 108 and a second portion 110. A cross-sectional shape associated with one or more of first portion 108 and second portion 110 may be one of a circle, a square, a rectangle, and a polygon. For example in a scenario, first portion 108 of housing 102 may have a circular cross section and second portion 110 of housing 102 may have a rectangular cross section.

First portion 108 of housing 102 receives the heat energy from a heat source. The heat source may include solar energy or any other sources of heat energy. The heat energy received by first portion 108 creates a temperature gradient between first portion 108 and second portion 110 of housing 102. For example, heat energy received by first portion 108 of housing 102 maintains a temperature level of first portion 108 above a temperature level of second portion 110 of housing 102. As a result, the temperature gradient is maintained between first portion 108 and second portion 110.

Travelling wave thermoacoustic piezoelectric apparatus 100 may further include a porous stack 112. Porous stack 112 may include, but are not limited to, one or more of metal foils, a metal mesh, a sheet of a foamed metal, and a sheet of filter paper. Porous stack 112 is positioned between first portion 108 and second portion 110. Second portion 110 includes a cold heat exchanger 114. Cold heat exchanger 114 is positioned near to an end of porous stack 112 within housing 102. For example, porous stack 112 is positioned between first portion 108 and cold heat exchanger 114 within housing 102.

Referring back to the temperature gradient developed between first portion 108 and second portion 110 of housing 102, compressible fluid 106 within housing 102 traverses between first portion 108 and second portion 110 through porous stack 112 and inertance component 104 in response to creation of the temperature gradient. Thereafter, a cyclic transformation takes place inside compressible fluid 106. The cyclic transformation includes compression, heating, expansion, and cooling of one or more fluid parcels of compressible fluid 106 within housing 102. A cyclic transformation of the one or more fluid parcels in a travelling wave thermoacoustic piezoelectric apparatus is explained in detail in conjunction with FIG. 4A and FIG. 4B. This cyclic transformation of compressible fluid 106 results in the generation of travelling acoustic waves within housing 102.

For example, in an instance, travelling acoustic waves may be generated in a housing of a travelling wave thermoacoustic piezoelectric apparatus. The travelling acoustic waves may travel between a first portion and a second portion of the housing through a porous stack and an inertance component inside the housing. The travelling acoustic waves may be generated based on movement of one or more fluid parcels of a compressible fluid within the housing.

In an embodiment, first portion 108 may facilitate acoustic compliance for the travelling acoustic waves within housing 102. Due to the acoustic compliance, the travelling acoustic waves entering inside first portion 108 increases the pressure inside first portion 108. The travelling acoustic waves travel through first portion 108 until the pressure inside first portion 108 reaches a threshold capacitance pressure. After reaching the threshold capacitance pressure, the travelling acoustic waves travel through first portion 108 until the pressure of the travelling acoustic waves remains higher than the threshold capacitance pressure. The travelling acoustic waves may not travel through first portion 108 when the pressure of the travelling acoustic waves is less than the threshold capacitance pressure.

In another embodiment, inertance component 104 may facilitate acoustic inertance for the travelling acoustic waves within housing 102. Due to the acoustic inertance, the travelling acoustic waves entering inside inertance component 104 increases the pressure inside inertance component 104. The travelling acoustic waves travel through inertance component 104 after the pressure inside inertance component 104 reaches a threshold inertance pressure. Until the pressure inside inertance component 104 is less than the threshold inertance pressure the travelling acoustic waves may not travel through inertance component 104.

Thus, first portion 108 and inertance component 104 may provide a positive feedback to the travelling acoustic waves. This positive feedback may increase the frequency associated with the travelling acoustic waves. This is explained in detail in conjunction with FIG. 3.

Travelling wave thermoacoustic piezoelectric apparatus 100 includes a resonator 116. Resonator 116 has an end connected to second portion 110 of housing 102. A configuration of resonator 116 may be one of a straight configuration and an optimally shaped configuration. In an embodiment, resonator 116 may be optimally shaped to have a tapered configuration. The travelling acoustic waves within housing 102 resonate with resonator 116 to generate acoustic energy within resonator 116. For example, travelling acoustic waves within housing 102 may generate an acoustic wave inside resonator 116. The acoustic wave thus generated resonates within resonator 116 to generate the acoustic energy.

In an embodiment, the acoustic energy may be generated within resonator 116 by varying temperature associated with cold heat exchanger 114. For example, temperature associated with cold heat exchanger 114 is decreased such that travelling acoustic waves within housing 102 generate an acoustic wave inside resonator 116, which resonates within resonator 116 to generate acoustic energy.

In another embodiment, the acoustic energy may be generated within resonator 116 by varying the temperature of compressible fluid 106. The temperature of compressible fluid 106 may be varied by varying the temperature of surrounding of travelling wave thermoacoustic piezoelectric apparatus 100. For example, in order to create resonance within resonator 116, the temperature of surrounding is increased. This increase in temperature of the surrounding heats housing 102 thereby heating compressible fluid 106 for generating an acoustic wave within resonator 116 based on travelling acoustic waves generated within housing 102. The acoustic wave thus generated creates the resonance within resonator 116 to generate the acoustic energy within resonator 116.

In yet another embodiment, the acoustic energy may be generated within resonator 116 by varying the heat energy supplied by the heat source to first portion 108. For example, in an instance, a temperature level of first portion 108 of housing 102 and a temperature level of second portion 110 of housing 102 may become equal, thereby resulting in loss of temperature gradient between first portion 108 and second portion 110. To develop the temperature gradient, an amount of heat energy supplied to first portion 108 of housing 102 may be increased.

Further, in another instance, the temperature level of first portion 108 of housing 102 may decrease, thereby resulting in decrease in the temperature gradient between first portion 108 and second portion 110 of housing 102. This decrease in the temperature gradient results in generation of low frequency travelling acoustic waves. In order to develop the travelling acoustic waves of higher frequency, an amount of heat energy supplied to first portion 108 may be increased to increase the temperature level of first portion 108. This increase in temperature level of first portion 108 results in increase in the temperature gradient between first portion 108 and second portion 100. Such an increase in the temperature gradient facilitates in the creation of the travelling acoustic waves of higher frequency to resonate with resonator 116.

The acoustic energy created within resonator 116 from the travelling acoustic waves may be used to generate the electrical energy. To this end, travelling wave thermoacoustic piezoelectric apparatus 100 includes a piezoelectric bimorph 118 that utilizes this acoustic energy to generate the electrical energy. Piezoelectric bimorph 118 is configured at an end of resonator 116 opposite to the end of resonator 116 connected to second portion 110. The acoustic energy generated within resonator 116 triggers an oscillation of piezoelectric bimorph 118. The oscillation of piezoelectric bimorph 118 is utilized for generating the electrical energy. The electrical energy is generated using any existing system known in the art. The existing system utilizes the oscillation of piezoelectric bimorph 118 to generate the electrical energy. Thus, the amount of the electrical energy generated may be based on a frequency of oscillation of piezoelectric bimorph 118. For example, a frequency of oscillation of piezoelectric bimorph 118 may be increased to increase the amount of electrical energy generated.

The frequency of oscillation of piezoelectric bimorph 118 is directly proportional to the amount of acoustic energy generated within resonator 116. In an embodiment, this acoustic energy generated may be varied by varying the heat energy supplied by the heat source to first portion 108. For example, in an instance, temperature level of first portion 108 of housing 102 and the temperature level of second portion 110 of housing 102 may become equal, thereby resulting in loss of temperature gradient between first portion 108 and second portion 110. To develop the temperature gradient, an amount of the heat energy supplied to first portion 108 of housing 102 may be increased.

In another instance, the temperature level of first portion 108 of housing 102 may decrease, thereby resulting in decrease in the temperature gradient between first portion 108 and second portion 110 of housing 102. This decrease in temperature gradient results in generation of low frequency travelling acoustic waves. In order to develop travelling acoustic waves of higher frequency, the amount of the heat energy supplied to first portion 108 may be increased to increase the temperature level of first portion 108. The increase in temperature level of first portion 108 results in increase in temperature gradient between first portion 108 and second portion 110. Such an increase in temperature gradient facilitates in the creation of travelling acoustic waves of higher frequency to resonate with resonator 116.

In an embodiment, the heat energy supplied to first portion 108 may be varied by changing the area of first portion 108 exposed to the heat source. For example, heat energy supplied to first portion 108 may be varied by exposing a larger area of first portion 108 of housing 102 to the heat source. In another embodiment, the heat energy is varied based on a threshold heat energy. The threshold heat energy is associated with an amount of heat energy required to trigger the oscillation of piezoelectric bimorph 118. For example, the threshold heat energy is the amount of heat energy required for generating first harmonic resonance within resonator 116. However, it will be apparent to the person skilled in the art that the threshold heat energy may be the amount of heat energy for generating resonance of any harmonic level within resonator 116.

As mentioned earlier, travelling wave thermoacoustic piezoelectric apparatus 100 uses piezoelectric bimorph 118 and includes fixed parts to generate the electrical energy from the heat energy. The use of such fixed parts eliminates the need of sliding seal mechanisms. Referring back to acoustic compliance and acoustic inertance of travelling wave thermoacoustic piezoelectric apparatus 100 provide positive feedback to the travelling acoustic waves. This increases the intensity of the travelling acoustic waves generated in housing 102 thereby increasing the output and efficiency of travelling wave thermoacoustic piezoelectric apparatus 100. Moreover, this also reduces the need of high temperature gradient between first portion 108 and second portion 110 to create high intensity travelling acoustic waves within housing 102.

Figure 2:
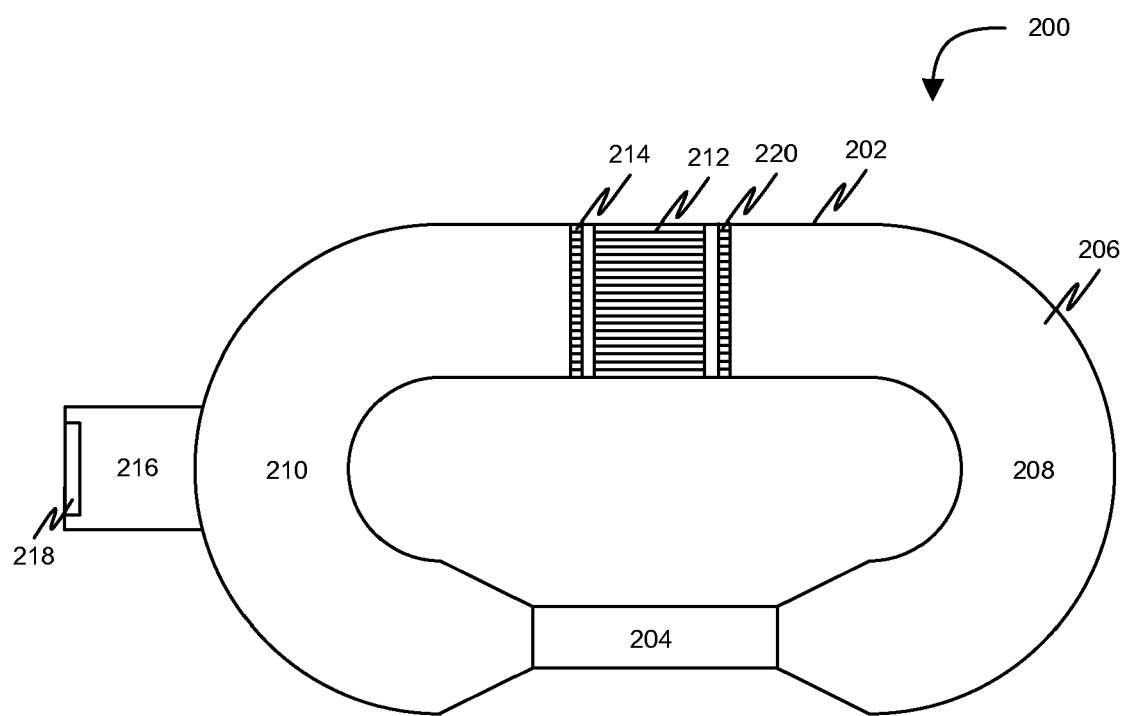
FIG. 2 illustrates a travelling wave thermoacoustic piezoelectric apparatus in accordance with another embodiment of the invention.

Referring now to FIG. 2, a travelling wave thermoacoustic piezoelectric apparatus 200 in accordance with another embodiment of the invention is shown. Travelling wave thermoacoustic piezoelectric apparatus 200 includes a housing 202 having two ends. The two ends of housing 202 are connected by an inertance component 204. Housing 202 includes a compressible fluid 206. Further, housing 202 has a first portion 208 and a second portion 210. This is explained in detail in conjunction with FIG. 1.

Further, travelling wave thermoacoustic piezoelectric apparatus 200 includes a porous stack 212 within housing 202. Second portion 210 of housing 202 includes a cold heat exchanger 214. Additionally, travelling wave thermoacoustic piezoelectric apparatus 200 includes a resonator 216 and a piezoelectric bimorph 218 within resonator 216. First portion 206, porous stack 212, cold heat exchanger 214, inertance component 204, and piezoelectric bimorph 218 are structurally similar to first portion 108, porous stack 112, cold heat exchanger 114, inertance component 104, and piezoelectric bimorph 118 of travelling wave thermoacoustic piezoelectric apparatus 100. Additionally, first portion 208, porous stack 212, cold heat exchanger 214, inertance component 204, and piezoelectric bimorph 218 also function in a similar fashion as first portion 108, porous stack 112, cold heat exchanger 114, inertance component 104, and piezoelectric bimorph 118. The function of first portion 208, porous stack 212, cold heat exchanger 214, inertance component 204, and piezoelectric bimorph 218 are explained in detail in conjunction with FIG. 1.

Travelling wave thermoacoustic piezoelectric apparatus 200 further includes a hot heat exchanger 220 within housing 202. Hot heat exchanger 220 is positioned at an end of porous stack 212 opposite to an end of porous stack 222 near to cold heat exchanger 214. In this case, porous stack 212 may be positioned between hot heat exchanger 220 and cold heat exchanger 214 as shown in FIG. 2. Hot heat exchanger 220 receives heat energy from a heat source. The heat energy received by hot heat exchanger 220 creates a temperature gradient between first portion 208 and second portion 210 of housing 202. For example, a temperature gradient between first portion 208 and second portion 210 is created as first portion 208 of housing 202 is at higher temperature and second portion 210 of housing 202 is at lower temperature. Hot heat exchanger 220 heats first portion 208 to maintain first portion 208 at a higher temperature. Similarly, cold heat exchanger 214 cools second portion 210 of housing 202 to keep second portion 210 at a lower temperature.

Referring back to the temperature gradient between first portion 208 and second portion 210, compressible fluid 206 within housing 202 traverses between first portion 208 and second portion 210 through porous stack 212 and inertance component 204 in response creation of the temperature gradient. Due to the temperature gradient, a cyclic transformation takes place inside compressible fluid 206. The cyclic transformation includes compression, heating, expansion, and cooling of one or more of fluid parcels of compressible fluid 206 within housing 202. A cyclic transformation of one or more fluid parcels in a travelling wave thermoacoustic piezoelectric apparatus is explained in detail in conjunction with FIG. 4A and FIG. 4B. The cyclic transformation of compressible fluid 206 generates travelling acoustic waves within housing 202. The generation of travelling acoustic waves is explained in detail in conjunction with FIG. 1.

In an embodiment, the travelling acoustic waves may be generated within housing 102 by varying the heat energy supplied by the heat source to first portion 208. The heat energy supplied to first portion 208 may be varied by changing the area of hot heat exchanger 220 exposed to the heat source. For example, heat energy supplied may be varied by exposing a larger area of hot heat exchanger 220 to the heat source. In another embodiment, temperature associated with hot heat exchanger 220 is varied to generate the travelling acoustic waves within housing 202. The travelling acoustic waves resonate with resonator 216 to generate acoustic energy within resonator 216. Thereafter, the acoustic energy triggers an oscillation of piezoelectric bimorph 218. The oscillation of piezoelectric bimorph 218 is utilized for generating electrical energy. This is explained in detail in conjunction with FIG. 1.

Figure 3:
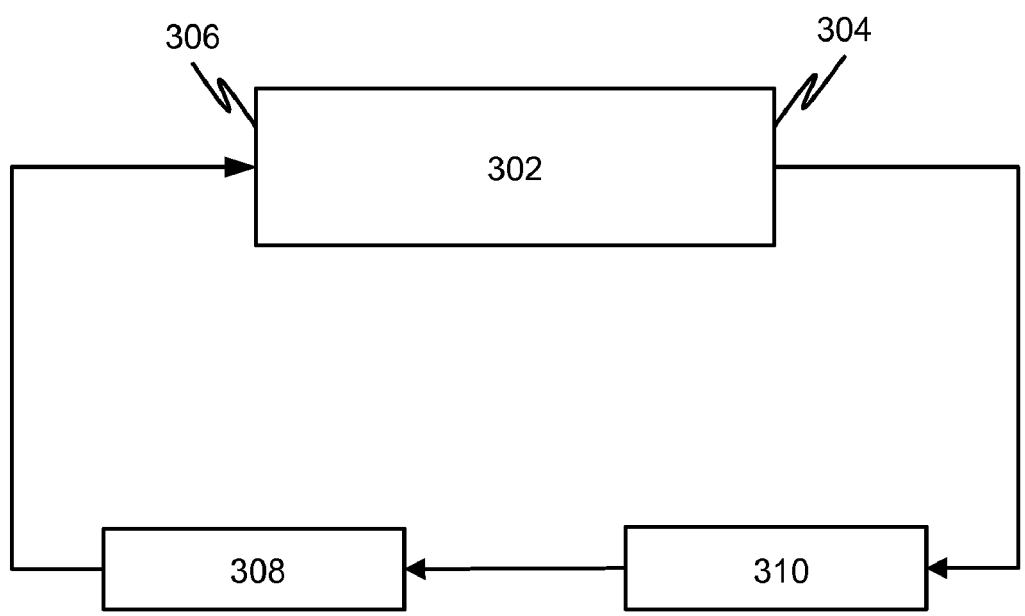
FIG. 3 illustrates role of an acoustic compliance and an acoustic inertance inside a travelling wave thermoacoustic piezoelectric apparatus for generating travelling acoustic waves in accordance with an embodiment of the invention.

Turning now to FIG. 3 that illustrates a block diagram showing the role of an acoustic compliance and an acoustic inertance inside a travelling wave thermoacoustic piezoelectric apparatus for generating travelling acoustic waves in accordance with an embodiment of the invention. The travelling acoustic waves are generated inside a housing such as, housing 102 and housing 202 of the travelling wave thermoacoustic piezoelectric apparatus such as, travelling wave thermoacoustic piezoelectric apparatus 100 and travelling wave thermoacoustic piezoelectric apparatus 200. The travelling acoustic waves are generated inside a porous stack 302 based on a temperature gradient between two ends such as, a hot end 304 and a cold end 306. Porous stack 302 is similar to porous stack 112 and porous stack 212. Temperature level of hot end 304 is higher as compared to temperature level cold end 306 to maintain the temperature gradient. Temperature of hot end 304 is maintained at a higher level using heat energy supplied to a first portion such as, first portion 108 and first portion 208 of the housing. Similarly, temperature of cold end 306 is maintained at a lower level than the temperature level of hot end 304 using a cold heat exchanger such as, cold heat exchanger 114 and cold heat exchanger 214 within a second portion such as, second portion 110 and second portion 210 of the housing.

The travelling acoustic waves thus generated travel between the first portion and the second portion through porous stack 302 and an inertance component 308. Inertance component 308 is similar to inertance component 104 and inertance component 204. Inertance component 308 facilitates acoustic inertance for the travelling acoustic waves. Additionally, the first portion acts as a compliance 310 inside the housing. Thus, compliance 310 facilitates acoustic compliance for the travelling acoustic waves. The travelling acoustic waves generated inside porous stack 302 travel through compliance 310 and inertance component 308 forming a loop inside the housing. The generation of travelling acoustic waves is explained in detail in conjunction with FIG. 4A and FIG. 4B.

In an instance, porous stack 302, compliance 310, and inertance component 308 form a closed circuit. The closed circuit has compliance 310 as capacitance and inertance component 308 as inductance. Compliance 310 and inertance component 308 are tuned such that the velocity and the pressure of the travelling acoustic waves are in phase. Further, compliance 310 and inertance component 308 provide a positive feedback to the travelling acoustic waves. The positive feedback provided to the travelling acoustic waves is similar to a positive feedback provided by a capacitance and an inductance serially connected in a circuit. This positive feedback increases the frequency of the travelling acoustic waves. Additionally, compliance 310 and inertance component 308 reduce an impedance of the travelling acoustic waves. Thereafter, the travelling acoustic waves with increased frequency and reduced impedance resonates with a resonator such as, resonator 116 and resonator 216 of the travelling wave thermoacoustic piezoelectric apparatus. Consequently, an acoustic energy is generated within the resonator thereby oscillating a piezoelectric bimorph such as, piezoelectric bimorph 118 and piezoelectric bimorph 218 to generate electrical energy.

Figure 4A:
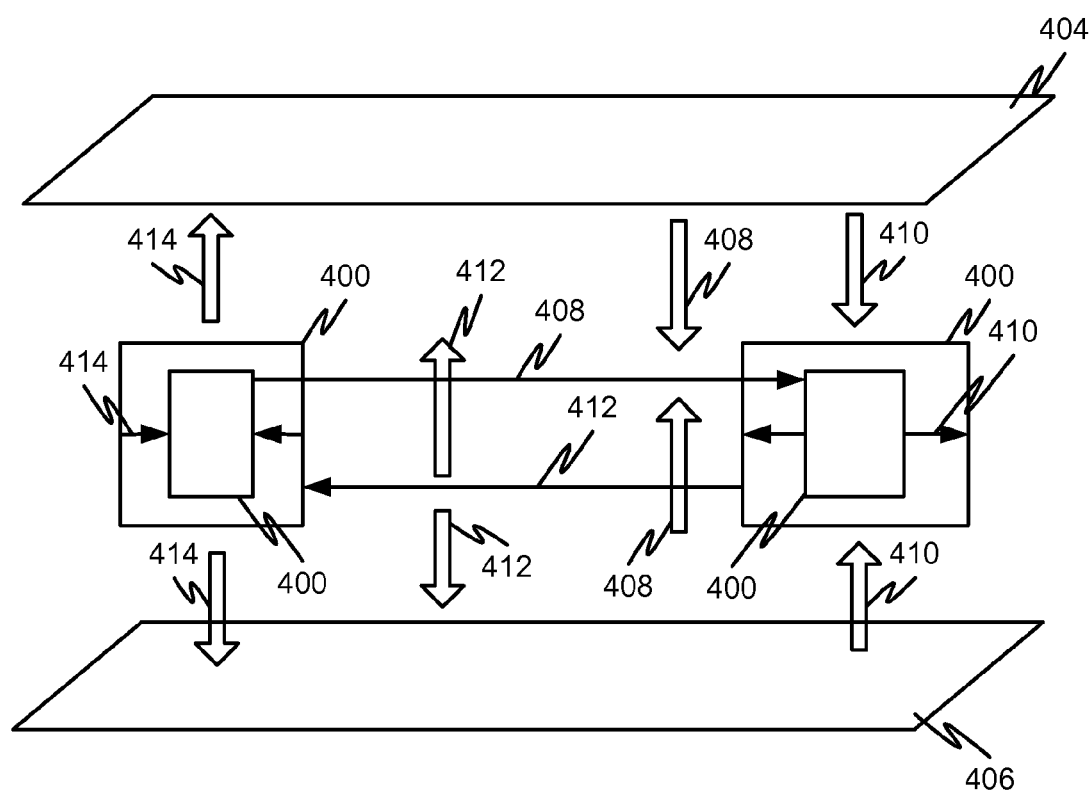
FIG. 4A illustrates a thermodynamics cycle of a fluid parcel of a compressible fluid inside a porous stack within a travelling wave thermoacoustic piezoelectric apparatus in accordance with an embodiment of the invention.
Figure 4B:
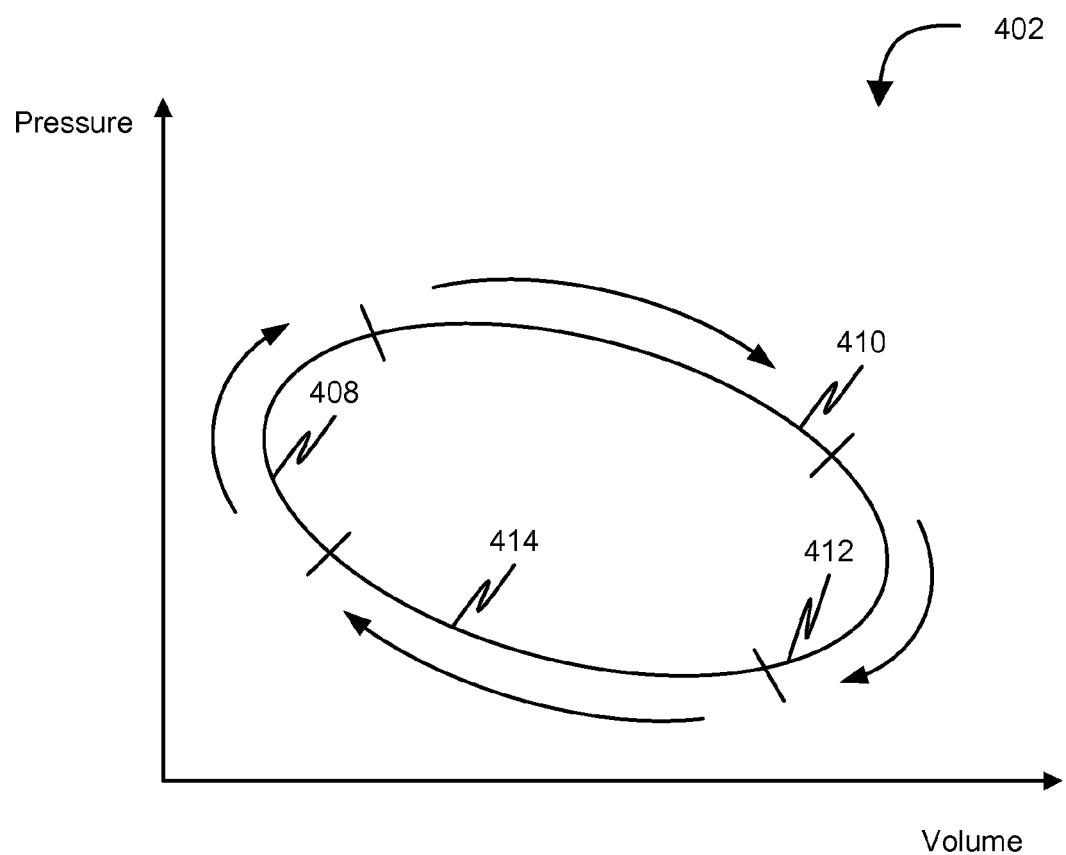
FIG. 4B illustrates a Pressure-Volume (P-V) diagram associated with the thermodynamic cycle of the fluid parcel inside the porous stack.

Referring now to FIG. 4A that illustrates a thermodynamic cycle of a fluid parcel 400 of a compressible fluid inside a porous stack within a travelling wave thermoacoustic piezoelectric apparatus for generating travelling acoustic waves and FIG. 4B that illustrates a Pressure-Volume (P-V) diagram 402 associated with the thermodynamic cycle of fluid parcel 400, in accordance with an embodiment of the invention. The thermodynamic cycle indicates a cyclic transformation undergone by fluid parcel 400 of the compressible fluid such as, compressible fluid 104 and compressible fluid 204 within the travelling wave thermoacoustic piezoelectric apparatus such as, travelling wave thermoacoustic piezoelectric apparatus 100 and travelling wave thermoacoustic piezoelectric apparatus 200. The cyclic transformation includes compression of fluid parcel 400, heating of fluid parcel 400, expansion of fluid parcel 400, and cooling of fluid parcel 400. Further, during the cyclic transformation of fluid parcel 400, a pressure and a volume associated with fluid parcel 400 changes and such a change in the pressure and the volume is indicated in P-V diagram 402.

The cyclic transformation of fluid parcel 400 takes place upon creation of a temperature gradient between a first portion such as, first portion 108 and first portion 208, and a second portion, such as second portion 110 and second portion 210. The temperature gradient is created as the first portion has a higher temperature as compared to the second portion. This is explained in detail in conjunction with FIG. 1.

Due to this temperature gradient, fluid parcel 400 traverses between a cold heat exchanger such as, cold heat exchanger 114 and cold heat exchanger 214 and a hot heat exchanger such as, hot heat exchanger 220 through the porous stack such as, porous stack 112 and porous stack 212 of the travelling wave thermoacoustic piezoelectric apparatus. The temperature gradient enables fluid parcel 400 present near the cold heat exchanger to travel from the cold heat exchanger towards the hot heat exchanger at stage 408. Simultaneously, fluid parcel 400 receives heat energy from neighborhood walls of the porous stack such as, a wall 404 and a wall 406. The fluid parcel 400 upon getting heated expands as indicated at stage 408. This heating of fluid parcel 400 and expansion of fluid parcel 400 is indicated by stage 408 as shown in P-V diagram 402. As indicated by stage 408 in P-V diagram 402, pressure increases during this stage and a volume associated with fluid parcel 400 initially reduces and then increases. Towards the end of stage 408, temperature of fluid parcel 400 is lower as compared to temperature of wall 404 and wall 406 of the porous stack near fluid parcel 400. Thereafter, at stage 410, fluid parcel 400 receives heat energy from one or more of the hot heat exchanger, wall 404 and wall 406. This results in further expansion of fluid parcel 400 due to heating of fluid parcel 400. The heating and expansion of fluid parcel 400 is indicated by stage 410 as shown in P-V diagram 402. At stage 410, the pressure of fluid parcel 400 gradually decreases and the volume of fluid parcel 400 increases. Towards the end of stage 410, fluid parcel 400 starts travelling towards the cold heat exchanger from the hot heat exchanger.

Thereafter at stage 412, while travelling towards the cold heat exchanger, fluid parcel 400 releases heat to wall 404 and wall 406 of the porous stack as temperature level of wall 404 and wall 406 decreases towards the cold heat exchanger. The release of heat results in cooling of fluid parcel 400. The cooling of fluid parcel 400 results in compression of fluid parcel 400 at stage 412. This compression and cooling of fluid parcel 400 is indicated by stage 412 as shown in P-V diagram 402. During this stage 412, the pressure and the volume of fluid parcel 400 decreases as indicated in P-V diagram 402. Towards the end of stage 412, fluid parcel 400 has temperature higher as compared to temperature of wall 404 and wall 406 of the porous stack near fluid parcel 400. At stage 414, fluid parcel 400 releases heat to one or more of the cold heat exchanger, wall 404 and wall 406 near fluid parcel 400. This result in further compression of fluid parcel 400 based on cooling of fluid parcel 400. The cooling and compression of fluid parcel 400 is indicated by stage 414 as shown in P-V diagram 402. During stage 414, the pressure of fluid parcel 400 increases and the volume of fluid parcel 400 decreases as indicated in P-V diagram 402. Thereafter, towards the end of stage 414, fluid parcel 400 starts travelling towards the hot heat exchanger from the cold heat exchanger similar to stage 408. Thus, resulting in the cyclic transformation of fluid parcel 400 inside the porous stack within the travelling wave thermoacoustic piezoelectric apparatus.

During this cyclic transformation within the porous stack, the compression and expansion of the one or more fluid parcels of the compressible fluid results in back and forth movement of the one or more fluid parcels inside the travelling wave thermoacoustic piezoelectric apparatus. The back and forth movement of the one or more fluid parcels generate travelling acoustic waves within the housing. The travelling acoustic waves travel between the first portion and the second portion through an inertance component such as, inertance component 104 and inertance component 204. The travelling acoustic waves in the second portion resonate with a resonator such as, resonator 116 and resonator 216 of the travelling wave thermoacoustic piezoelectric apparatus. This generates acoustic energy inside the resonator thereby oscillating a piezoelectric bimorph such as, piezoelectric bimorph 118 and piezoelectric bimorph 218 to generate electrical energy. This is explained in detail in conjunction with FIG. 1, FIG. 2, and FIG. 3.

Figure 5:
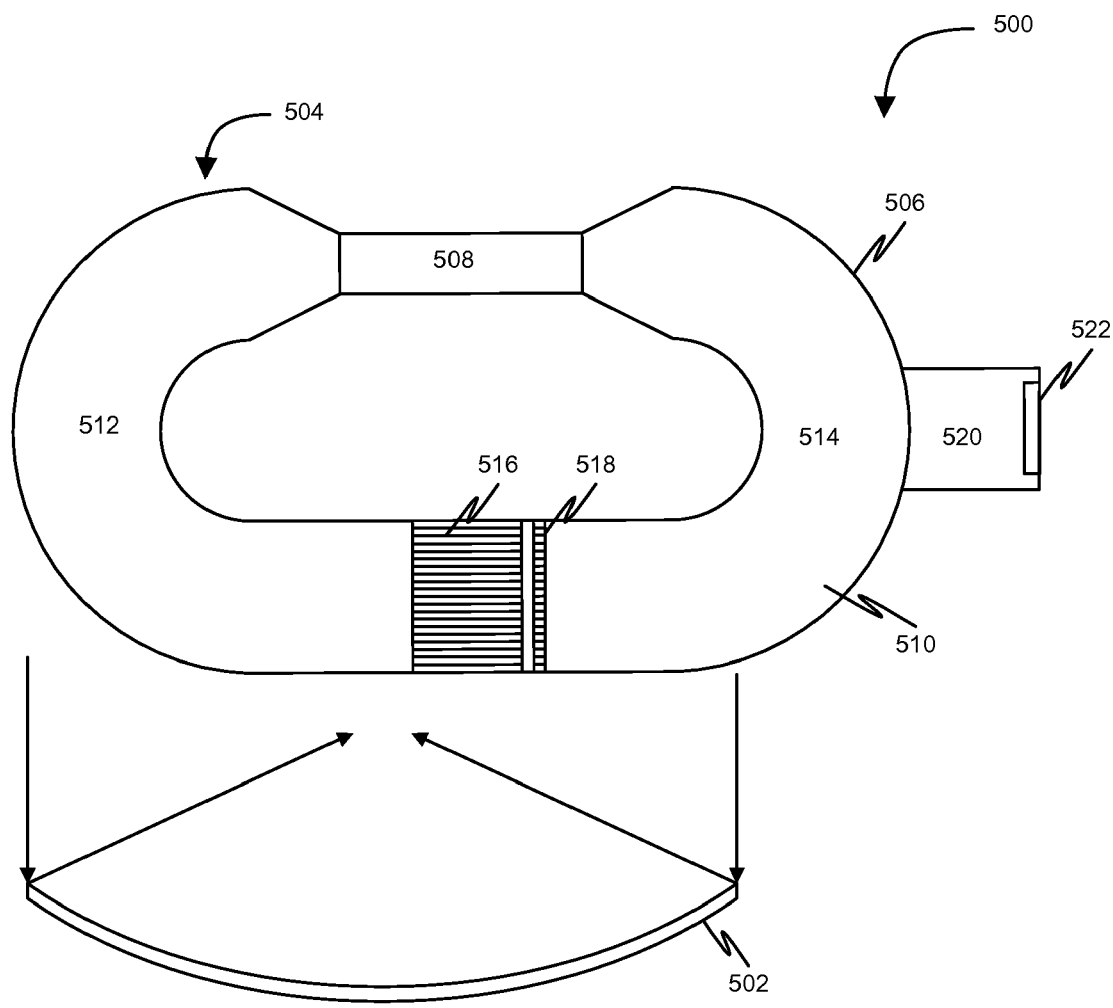
FIG. 5 illustrates a travelling wave thermoacoustic piezoelectric system in accordance with an embodiment of the invention.

Referring now to FIG. 5, a travelling wave thermoacoustic piezoelectric system 500 is illustrated, in accordance with an embodiment of the invention. Travelling wave thermoacoustic piezoelectric system 500 generates electrical energy from heat energy i.e. solar energy. Travelling wave thermoacoustic piezoelectric system 500 includes a solar concentrator 502 and a travelling wave thermoacoustic piezoelectric apparatus 504. Solar concentrator 502 supplies heat energy for generating the electrical energy. Solar concentrator 502 is optimally shaped to efficiently provide the heat energy to travelling wave thermoacoustic piezoelectric apparatus 504 for generating travelling acoustic waves. Further, travelling wave thermoacoustic piezoelectric apparatus 504 includes a housing 506 having two ends. The two ends of housing 506 are connected by an inertance component 508. Housing 506 includes a compressible fluid 510. Further, housing 506 includes a first portion 512 and a second portion 514. This has been explained in detail in conjunction with FIG. 1.

First portion 512 of housing 506 receives the heat energy from solar concentrator 502. Solar concentrator 502 is arranged within travelling wave thermoacoustic piezoelectric system 500 in a manner for efficiently directing solar energy at first portion 512. The heat energy received by first portion 512 creates a temperature gradient between first portion 512 and second portion 514 of housing 506. The temperature associated with first portion 512 may be changed by varying an amount of heat energy supplied to first portion 512. The heat energy supplied to first portion 512 may be varied by adjusting an orientation of solar concentrator 502. Further, travelling wave thermoacoustic piezoelectric apparatus 504 may include a porous stack 516. Porous stack 516 is positioned between first portion 512 and second portion 514. Second portion 514 includes a cold heat exchanger 518. Cold heat exchanger 518 is positioned near to an end of porous stack 516 within housing 506.

In an embodiment, travelling wave thermoacoustic piezoelectric apparatus 504 may include a hot heat exchanger (not shown in FIG. 5) within housing 506. The hot heat exchanger is positioned at an end of porous stack 516 opposite to an end of porous stack 516 where cold heat exchanger 518 is positioned. The hot heat exchanger receives heat from solar concentrator 502. The heat received by the hot heat energy exchanger creates the temperature gradient between first portion 512 and second portion 514 of housing 506. This has been explained in detail in conjunction with FIG. 3.

Referring back to the temperature gradient created between first portion 512 and second portion 514, compressible fluid 510 within housing 506 traverses between first portion 512 and second portion 514 through porous stack 516 and inertance component 508 in response creation of the temperature gradient. Thereafter, a cyclic transformation takes place inside compressible fluid 510. The cyclic transformation includes compression, heating, expansion, and cooling of one or more fluid parcels of compressible fluid 510 within housing 506. A cyclic transformation of one or more fluid parcels in a travelling wave thermoacoustic piezoelectric apparatus has been explained in detail in conjunction with FIG. 4A and FIG. 4B. This cyclic transformation of compressible fluid 510 results in the generation of travelling acoustic waves within housing 506.

Additionally, travelling wave thermoacoustic piezoelectric apparatus 504 includes a resonator 520. Resonator 520 has an end connected to second portion 514 of housing 506. The travelling acoustic waves within housing 506 resonate with resonator 520 to generate acoustic energy within resonator 520. Travelling wave thermoacoustic piezoelectric apparatus 504 also includes a piezoelectric bimorph 522. Piezoelectric bimorph 522 is configured at an end resonator 520 opposite to the end of resonator 520 connected to second portion 514. The acoustic energy generated within resonator 520 triggers an oscillation of piezoelectric bimorph 522. The oscillation of piezoelectric bimorph 522 is utilized for generating the electrical energy. This is explained in detail in conjunction with FIG. 1.

Various embodiments of the invention provide a travelling wave thermoacoustic piezoelectric apparatus for generating electrical energy from heat energy. The travelling wave thermoacoustic piezoelectric apparatus generates electrical energy using a piezoelectric bimorph without any moving parts. As a result, the electrical energy is generated efficiently without using complex mechanisms for the generation of the electrical energy. Further, the travelling wave thermoacoustic piezoelectric apparatus uses piezoelectric bimorph along with fixed parts thereby eliminating the need of sliding seal mechanisms. Moreover, acoustic compliance and acoustic inertance of the travelling wave thermoacoustic piezoelectric apparatus provide positive feedback to the travelling acoustic waves. This increases the intensity of the travelling acoustic waves generated in the housing thereby reducing the need of high temperature gradient between the first portion and the second portion to create high intensity travelling acoustic waves within the housing. Further, the positive feedback increasing the output and efficiency of the travelling wave thermoacoustic piezoelectric apparatus. Moreover, the travelling wave thermoacoustic piezoelectric apparatus may use solar energy directly to generate the electrical energy from the solar energy. This enables the travelling wave thermoacoustic piezoelectric apparatus to generate the electrical energy in an environment friendly manner.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A travelling wave thermoacoustic piezoelectric apparatus for generating electrical energy from heat energy, the travelling wave thermoacoustic piezoelectric apparatus comprising:
a housing with two ends comprising a compressible fluid, the housing having a first portion and a second portion, wherein the first portion receives the heat energy from a heat source for creating a temperature gradient between the first portion and the second portion;
a porous stack configured between the first portion and the second portion within the housing, the second portion comprising a cold heat exchanger positioned near to an end of the porous stack, wherein the two ends of the housing are connected by an inertance component, whereby the compressible fluid traverses between the first portion and the second portion through the porous stack and the inertance component to generate travelling acoustic waves;
a resonator having an end connected to the second portion of the housing, wherein the traveling acoustic waves resonates with the resonator to generate acoustic energy within the resonator; and
a piezoelectric bimorph configured at an end of the resonator opposite to the end of the resonator connected to the second portion, whereby the acoustic energy triggers an oscillation of the piezoelectric bimorph for generating the electrical energy.

2. The travelling wave thermoacoustic piezoelectric apparatus of claim 1, wherein the heat energy supplied by the heat source is varied based on a threshold heat energy for generating the acoustic energy within the resonator, the threshold heat energy is associated with an amount of heat energy required to trigger the oscillation of the piezoelectric bimorph.

3. The travelling wave thermoacoustic piezoelectric apparatus of claim 2, wherein the heat energy supplied by the heat source to the first portion is varied by changing the area of the first portion exposed to the heat source.

4. The travelling wave thermoacoustic piezoelectric apparatus of claim 1 further comprising,
a hot heat exchanger configured within the housing, the hot heat exchanger positioned at an end of the porous stack opposite to an end of the porous stack near to the cold heat exchanger, wherein the hot heat exchanger receives the heat energy from the heat source.

5. The travelling wave thermoacoustic piezoelectric apparatus of claim 4, wherein the heat energy supplied by the heat source to the hot heat exchanger is varied by changing the area of the hot heat exchanger exposed to the heat source.

6. The travelling wave thermoacoustic piezoelectric apparatus of claim 4, wherein temperature associated with the hot heat exchanger is varied to generate acoustic energy within the resonator.

7. The travelling wave thermoacoustic piezoelectric apparatus of claim 1, wherein the first portion facilitates acoustic compliance for the travelling acoustic waves within the housing.

8. The travelling wave thermoacoustic piezoelectric apparatus of claim 1, wherein the inertance component facilitates acoustic inertance for the travelling acoustic waves within the housing.

9. The travelling wave thermoacoustic piezoelectric apparatus of claim 1, wherein the first portion and the inertance component provide a positive feedback to increase frequency of the travelling acoustic waves.

10. The travelling wave thermoacoustic piezoelectric apparatus of claim 1, wherein temperature associated with the cold heat exchanger is varied to generate acoustic energy within the resonator.

11. The travelling wave thermoacoustic piezoelectric apparatus of claim 1, wherein temperature associated with the compressible fluid is varied to generate acoustic energy within the resonator.

12. The travelling wave thermoacoustic piezoelectric apparatus of claim 1, wherein the porous stack comprises at least one of metal foils, a metal mesh, a sheet of a foamed metal, and sheets of filter paper.

13. The travelling wave thermoacoustic piezoelectric apparatus of claim 1, wherein the compressible fluid is one of air and helium.

14. The travelling wave thermoacoustic piezoelectric apparatus of claim 1, wherein a configuration of the resonator is one of a straight configuration and an optimally shaped configuration.

15. A travelling wave thermoacoustic piezoelectric system for generating electrical energy from heat energy, wherein the travelling wave thermoacoustic piezoelectric system comprises:
   a solar concentrator configured to supply heat energy for generating the electrical energy; and
   a travelling wave thermoacoustic piezoelectric apparatus comprising,
   a housing with two ends comprising a compressible fluid, the housing having a first portion and a second portion, wherein the first portion receives the heat energy from the solar concentrator for creating a temperature gradient between the first portion and the second portion;
   a porous stack configured between the first portion and the second portion within the housing, the second portion comprising a cold heat exchanger positioned near to an end of the porous stack, wherein the two ends of the housing are connected by an inertance component, whereby the compressible fluid traverses between the first portion and the second portion through the porous stack and the inertance component to generate travelling acoustic waves;
   a resonator having an end connected to the second portion of the housing, wherein the traveling acoustic waves resonates with the resonator to generate acoustic energy within the resonator; and
   a piezoelectric bimorph configured at an end of the resonator opposite to the end of the resonator connected to the second portion, whereby the acoustic energy triggers an oscillation of the piezoelectric bimorph for generating the electrical energy.

16. The travelling wave thermoacoustic piezoelectric system of claim 15, wherein the heat energy supplied by the solar concentrator is varied based on a threshold heat energy for generating the acoustic energy within the resonator, the threshold heat energy is associated with an amount of heat energy required to generate acoustic energy within the resonator.

17. The travelling wave thermoacoustic piezoelectric system of claim 16, wherein the heat energy supplied by the solar concentrator to the first portion is varied by changing the area of the first portion exposed to the solar concentrator.

18. The travelling wave thermoacoustic piezoelectric system of claim 15 further comprising,
   a hot heat exchanger configured within the housing, the hot heat exchanger positioned at an end of the porous stack opposite to an end of the porous stack near to the cold heat exchanger, wherein the hot heat exchanger receives the heat energy from the solar concentrator.

19. The travelling wave thermoacoustic piezoelectric system of claim 18, wherein the heat energy supplied by the solar concentrator to the hot heat exchanger is varied by changing the area of the hot heat exchanger exposed to the solar concentrator.

20. The travelling wave thermoacoustic piezoelectric system of claim 18, wherein temperature associated with the hot heat exchanger is varied to generate acoustic energy within the resonator.

21. The travelling wave thermoacoustic piezoelectric system of claim 15, wherein the first portion facilitates acoustic compliance for the travelling acoustic waves within the housing.

22. The travelling wave thermoacoustic piezoelectric system of claim 15, wherein:
   the inertance component facilitates acoustic inertance for the travelling acoustic waves within the housing; and
   the first portion and the inertance component provide a positive feedback to increase frequency of the travelling acoustic waves.

23. The travelling wave thermoacoustic piezoelectric system of claim 15, wherein temperature associated with the cold heat exchanger is varied to generate acoustic energy within the resonator.

24. The travelling wave thermoacoustic piezoelectric system of claim 15, wherein temperature associated with the compressible fluid is varied to generate acoustic energy within the resonator.

25. The travelling wave thermoacoustic piezoelectric system of claim 15, wherein a configuration of the resonator is one of a straight configuration and an optimally shaped configuration.

* * * * *